(12) United States Patent
Wang et al.

(10) Patent No.: US 12,369,032 B2
(45) Date of Patent: Jul. 22, 2025

(54) METHOD FOR ESTABLISHING COMMUNICATION CHANNEL, AND USER TERMINAL

(71) Applicant: SHENZHEN PAX SMART NEW TECHNOLOGY CO., LTD., Guangdong (CN)

(72) Inventors: Xiaofeng Wang, Guangdong (CN); Aiping Zhou, Guangdong (CN); Gengxin Wu, Guangdong (CN)

(73) Assignee: SHENZHEN PAX SMART NEW TECHNOLOGY CO., LTD., Guangdong (CN)

( * ) Notice: Subject to any disclaimer, the term of this patent is extended or adjusted under 35 U.S.C. 154(b) by 374 days.

(21) Appl. No.: 18/043,756

(22) PCT Filed: Jul. 14, 2021

(86) PCT No.: PCT/CN2021/106322
§ 371 (c)(1),
(2) Date: Mar. 2, 2023

(87) PCT Pub. No.: WO2022/048318
PCT Pub. Date: Mar. 10, 2022

(65) Prior Publication Data
US 2023/0284027 A1    Sep. 7, 2023

(30) Foreign Application Priority Data

Sep. 3, 2020 (CN) .......................... 202010917870.0

(51) Int. Cl.
*H04W 12/108* (2021.01)
*H04W 12/0431* (2021.01)

(52) U.S. Cl.
CPC ..... *H04W 12/108* (2021.01); *H04W 12/0431* (2021.01)

(58) Field of Classification Search
CPC ........... H04W 12/0431; H04W 12/108; H04L 63/08; H04L 63/18; H04L 9/0861; H04L 9/321

See application file for complete search history.

(56) References Cited

U.S. PATENT DOCUMENTS

| 8,736,424 B2 * | 5/2014 | Shoarinejad | H04L 9/12 340/572.1 |
| 2012/0144468 A1 * | 6/2012 | Pratt | H04L 9/3271 726/7 |

(Continued)

FOREIGN PATENT DOCUMENTS

| CN | 102082796 A | 6/2011 |
| CN | 103942688 A | 7/2014 |

(Continued)

*Primary Examiner* — Kashif Siddiqui
(74) *Attorney, Agent, or Firm* — Brooks Kushman P.C.

(57) ABSTRACT

A method for establishing communication channel is provided, the method includes: performing a verification on the first verification information; generating second verification information when the verification of the first verification information is passed; generating third verification information according to the first verification information, and transmitting the second verification information and the third verification information to a server; performing a verification on the fourth verification information; when the verification of the fourth verification information is passed, generating fifth verification information according to the first verification information, generating sixth verification information according to the fourth verification information and transmitting the fifth verification information and the sixth verification information to the payment terminal; establishing a first communication channel based on a first session key, and establishing a second communication channel based on a second session key. By performing the method, the security of data transmission is ensured, and a risk is avoided.

15 Claims, 4 Drawing Sheets

(56) References Cited

U.S. PATENT DOCUMENTS

| | | | |
|---|---|---|---|
| 2015/0088756 A1 | 3/2015 | Makhotin et al. | |
| 2015/0237026 A1* | 8/2015 | Kumar | G06Q 20/4012 726/28 |
| 2016/0063471 A1* | 3/2016 | Kobres | G06Q 20/40145 705/18 |
| 2016/0381011 A1* | 12/2016 | Mu | H04L 63/083 713/169 |
| 2019/0266603 A1 | 8/2019 | Desjardins et al. | |
| 2019/0312720 A1* | 10/2019 | Liu | H04L 9/083 |

FOREIGN PATENT DOCUMENTS

| | | |
|---|---|---|
| CN | 104616148 A | 5/2015 |
| CN | 104616407 A | 5/2015 |
| CN | 104715362 A | 6/2015 |
| CN | 105530241 A | 4/2016 |
| CN | 105556553 A | 5/2016 |
| CN | 106375326 A | 2/2017 |
| CN | 106688004 A | 5/2017 |
| CN | 107679847 A | 2/2018 |
| CN | 107872450 A | 4/2018 |
| CN | 109670828 A | 4/2019 |
| CN | 110290134 A | 9/2019 |
| CN | 110912686 A | 3/2020 |

\* cited by examiner

METHOD FOR ESTABLISHING COMMUNICATION CHANNEL, AND USER TERMINAL

CROSS-REFERENCE TO RELATED APPLICATIONS

This application is a 35 U.S.C. § 371 national stage application of PCT patent application No. PCT/CN2021/106322, filed on Jul. 14, 2021, which claims priority to Chinese patent application No. 202010917870.0, filed on Sep. 3, 2020. The entire contents of which are incorporated herein by reference.

FIELD

The present application relates to the technical field of computers, and more particularly, to a method for establishing communication channel, and a user terminal.

BACKGROUND

The security of communication is extremely important in a financial system, the executive subjects participating in communication need to ensure that a used communication channel is safe. Otherwise, a series of security risks, such as conditions of leakage of sensitive data, data tampering, and the like, may occur. In the existing financial system, there are two participants, that is, a server and other devices. For example, in the existing POS trade processing system, there are multiple devices interacting with the server. When security verification is performed, a unidirectional verification is only performed on the communication between the multiple devices and the server, the performing of the unidirectional verification is only used to ensure that the server connected to the devices is safe. However, a security risk still exists due to utilization of this unidirectional verification.

SUMMARY

The embodiments of the present application provide a method for establishing a communication channel and a user terminal, which aims to solve a problem of security risk in the existing verification methods.

In the first aspect, a method for establishing communication channel is provided in the embodiments of the present application, the method is applied to a user terminal, and includes:
  receiving first verification information sent by a payment terminal, and performing a verification on the first verification information;
  generating second verification information when the verification of the first verification information is passed;
  generating third verification information according to the first verification information, and transmitting the second verification information and the third verification information to a server;
  performing, when receiving fourth verification information sent by the server, a verification on the fourth verification information; the fourth verification information is verification information generated by the server after the server has verified the second verification information and the third verification information respectively, and a verification of the second verification information and a verification of the third verification information are passed by the server;
  generating, when the verification of the fourth verification information is passed by the server, fifth verification information according to the first verification information, generating sixth verification information according to the fourth verification information, and transmitting the fifth verification information and the sixth verification information to the payment terminal; and
  establishing a first communication channel between the user terminal and the payment terminal based on a first session key between the user terminal and the payment terminal, and establishing a second communication channel between the user terminal and the server based on a second session key between the user terminal and the server, when detecting that a verification of the fifth verification information and a verification of the sixth verification information are passed by the payment terminal.

Furthermore, the first verification information includes a first public key and first signature data; the first signature data includes first device information of the payment terminal, a first random number generated by the payment terminal, and a first key serial number;
  said receiving the first verification information sent by the payment terminal and performing the verification on the first verification information comprises:
  receiving the first public key and the first signature data sent by the payment terminal;
  performing a verification on the first public key according to a first preset certificate; and
  using the first public key to verify the first signature data when the verification of the first public key is passed.

Furthermore, said generating the second verification information includes:
  obtaining a second random number, timestamp information, and second device information of the user terminal, and performing a hash computation on the second random number, the timestamp information and the second device information according to a preset white box signature key to obtain second signature data; and
  obtaining the second verification information according to the second signature data.

Furthermore, the fourth verification information includes a fourth public key and fourth signature data;
  said performing the verification on the fourth verification information when receiving the fourth verification information sent by the server includes:
  performing a verification on the fourth public key according to a second preset certificate when the fourth public key and the fourth signature data sent by the server are obtained; and
  using the fourth public key to verify the fourth signature data when the verification of the fourth public key is passed.

Furthermore, said obtaining the fourth public key and the fourth signature data sent by the server includes:
  receiving the fourth verification information sent by the server;
  performing, according to a preset white box signature key, a white box hash computation on the second random number to generate a first data encryption key; and
  using the first data encryption key to restore the fourth verification information so as to obtain the fourth public key and the fourth signature data.

Furthermore, said establishing the first communication channel between the user terminal and the payment terminal based on the first session key between the user terminal and the payment terminal includes:

transmitting a random number seed generation request to the payment terminal;

receiving a first handshake public key, fourth signature data, and a random number ciphertext sent by the payment terminal;

performing a white box computation on the first handshake public key to obtain a second data encryption key;

decrypting, according to the second data encryption key, the random number ciphertext to obtain a third random number generated by the payment terminal;

performing, by using a preset white box signature key, a computation on the third random number and the second random number to obtain fifth signature data;

storing the third random number and generating a second handshake public key, when the fourth signature data is consistent with the fifth signature data;

performing, according to the preset white box signature key, a computation on the third random number and the second handshake public key to generate sixth signature data;

transmitting the second handshake public key and the sixth signature data to the payment terminal;

receiving first handshake information sent by the payment terminal; and determining the first session key between the user terminal and the payment terminal according to the first handshake information, and establishing the first communication channel between the user terminal and the payment terminal based on the first session key between the user terminal and the payment terminal.

Furthermore, said establishing the second communication channel between the user terminal and the server based on the second session key between the user terminal and the server includes:

performing, according to a preset white box data key, a white box hash computation on a sixth random number to generate the second session key between the user terminal and the server, and establishing the second communication channel between the user terminal and the server based on the second session key between the user terminal and the server.

In the second aspect, a user terminal is provided in one embodiment of the present application. The user terminal includes a memory, a processor, and a computer program stored in the memory and executable by the processor. The processor is configured to, when executing the computer program, implement the method for establishing communication channel described in the first aspect.

In the third aspect, a non-transitory computer-readable storage medium is provided in one embodiment of the present application. The computer-readable storage medium stores a computer program, that, when executed by a processor of a user terminal, causes the processor of the user terminal to implement the method for establishing communication channel described in the first aspect.

In the embodiments of the present application, the first verification information sent by the payment terminal is received, and the first verification information is verified. The second verification information is generated when the verification of the first verification information is passed, the third verification information is generated according to the first verification information, and the second verification information and the third verification information are transmitted to the server. When the fourth verification information sent by the server is received, the fourth verification information is verified. The fifth verification information is generated according to the first verification information after the verification of the fourth verification information is passed. The sixth verification information is generated according to the fourth verification information, and the fifth verification information and the sixth verification information are sent to the payment terminal. The first communication channel is established between the user terminal and the payment terminal based on the first session key between the user terminal and the payment terminal, and the second communication channel between the user terminal and the server is established based on the second session key between the user terminal and the server, when it is detected that the payment terminal has performed verification on the fifth verification information and the sixth verification information respectively, and the verification of the fifth verification information and the verification of the sixth verification information are passed by the payment terminal. According to the technical solutions of the method for establishing communication channel, the security verification is respectively performed on the three participants (i.e., the user terminal, the server and the payment terminal) participating in communication, and communication channels (the first communication channel and the second communication channel) trusted by the three participants are established based on the session keys after the security verification is passed. Thus, the security of data transmission is guaranteed, and a security risk is avoided.

BRIEF DESCRIPTION OF THE DRAWINGS

In order to describe the technical solutions in the embodiments of the present application more clearly, a brief introduction regarding the accompanying drawings that need to be used for describing the embodiments or existing technology is given below. It is obvious that, the accompanying drawings described below are only some embodiments of the present application. A person of ordinary skill in the art may also obtain other drawings according to the current drawings without paying creative efforts.

DETAILED DESCRIPTION OF EMBODIMENTS

In the following descriptions, in order to describe but not intended to limit the present application, concrete details including specific system structure and technique are proposed to facilitate a comprehensive understanding of the embodiments of the present application. However, a person of ordinarily skill in the art should understand that, the present application can also be implemented in some other embodiments from which these concrete details are excluded. In other conditions, detailed explanations of method, circuit, device and system well known to the public are omitted, such that unnecessary details which are disadvantageous to understanding of the description of the present application can be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including the combinations thereof.

As is used in the description and the annexed claims, a term "if" may be interpreted as "when" or "once" or "in response to determination" or "in response to detection". Similarly, terms such as "if it is determined that", or "if a described condition or event is detected" may be interpreted as "once it is determined" or "in response to the determination" or "once the described condition or event is detected" or "in response to the detection of the described condition or event".

In addition, in the descriptions of the present application, terms such as "first" and "second", "third", etc., are only used for distinguishing purpose in description, but shouldn't be interpreted as indication or implication of a relative importance.

The descriptions of "referring to one embodiment" or "referring to some embodiments", or the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless otherwise they are specially emphasize in other manner. The terms "comprising", "including", "having" and their variations mean "including but is not limited to", unless otherwise they are specially emphasized in other manner.

Figure 1:
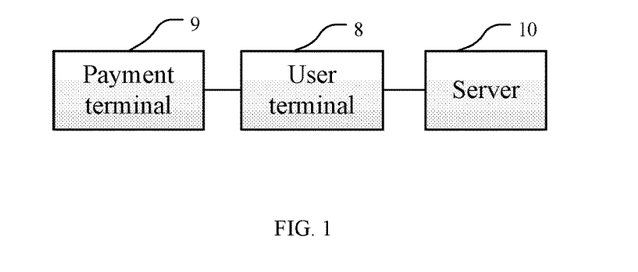
FIG. 1 illustrates a schematic structural diagram of an interactive system provided by the first embodiment of the present application.

Referring to FIG. 1, FIG. 1 illustrates a schematic diagram of an interactive system according to a first embodiment of the present application. The interactive system includes a user terminal 8, a payment terminal 9, and a server 10. The payment terminal 9 may be a Point of Sale (point of sale, POS) terminal which is not provided with a capability for network communication. The user terminal 8 is an unsafe device, such as a mobile phone used by a person. During use, the user terminal 8 and the payment terminal 9 are served as the front-end device in the interactive system. The payment terminal 9 serves to collect bank card data and execute transaction logic of the bank card. The user terminal 8 serves to communicate with the server 10 and collect a PIN of a cardholder. The server 10 serves to manage the user terminal 8 and the payment terminal 9. In this interactive system, due to the fact that the payment terminal 9 does not have a communication capability, if the payment terminal 9 needs to perform bidirectional verification with the server 10, the payment terminal 9 needs to communicate with the server 10 by means of the user terminal 8. The verification steps for the three participants are briefly described as follows: the user terminal 8 verifies a credibility of the payment terminal 9 firstly; then, the server 10 verifies a credibility of the user terminal 8 and a credibility of the payment terminal 9; then, the user terminal 8 verifies a credibility of the server 10, and the payment terminal 9 verifies a credibility of the user terminal 8 and a credibility of the server 10.

Figure 2:
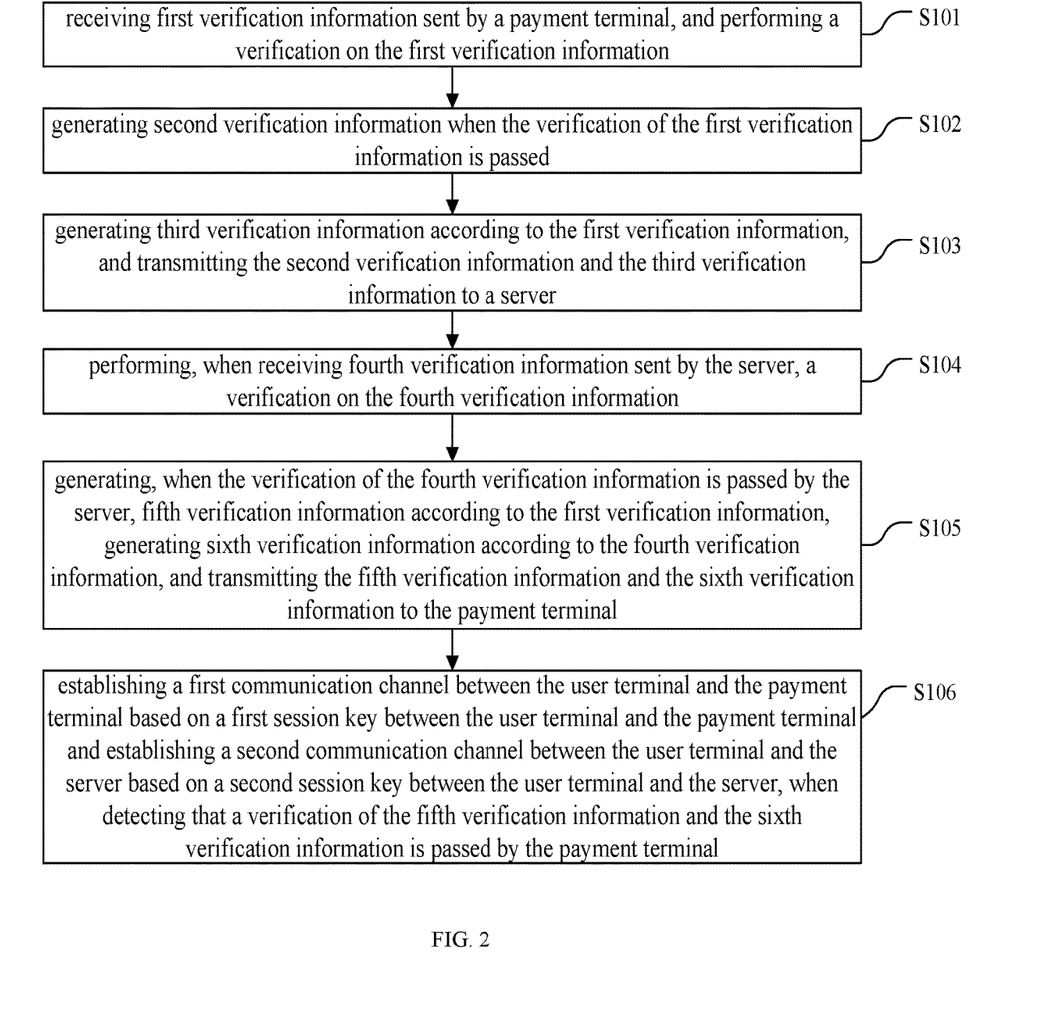
FIG. 2 illustrates a schematic flowchart of a method for establishing communication channel provided by the second embodiment of the present application.

Referring to FIG. 2, FIG. 2 illustrates a schematic flowchart of a method for establishing a communication channel according to a second embodiment of the present application. In this embodiment, an executive subject of the method for establishing the communication channel is the user terminal 8. The method for establishing the communication channel as shown in FIG. 2 may include:

In a step of S101, first verification information sent by the payment terminal 9 is received, and the first verification information is verified.

The user terminal 8 receives the first verification information sent by the payment terminal 9, and verifies the first verification information. The first verification information may be generated after the payment terminal 9 is triggered due to receiving of the verification request sent by the user terminal 8. That is, the user terminal 8 may send the verification request to the payment terminal 9 before the first verification information sent by the payment terminal 9 is received. The verification request may include device information of the user terminal 8 and a random number issued by the server 10, and the verification request is used to trigger the payment terminal 9 to send the first verification information to the user terminal 8.

The first verification information is used by the user terminal 8 to authenticate whether an identity of the payment terminal 9 is legalized and credible. When a verification of the first verification information is passed, it indicates that the identity authentication of the payment terminal 9 is passed, and other devices may be continued to be verified. When the verification of the first verification information is not passed, it indicates that the identity authentication of the payment terminal 9 is failed, a risk exists currently, and the communication channel is not continued to be established any more.

Figure 3:
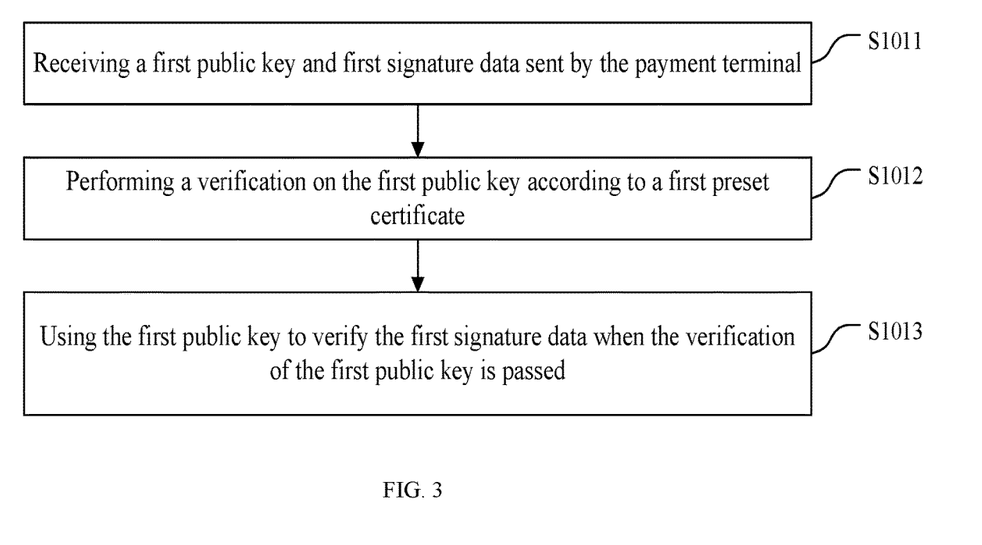
FIG. 3 illustrates a detailed schematic flowchart of a step S101 in the method for establishing communication channel provided by the second embodiment of the present application.

A method for verifying the first verification information may be implemented by adopting a signature verification method. Generally speaking, the signature verification is completed by utilizing the characteristics of the public key and the private key, which is not limited herein. In one possible implementation, the first verification information includes a first public key and first signature data, the first signature data includes first device information of the payment terminal, a first random number generated by the payment terminal 9, and a first key serial number. The step S101 may include steps S1011-S1013, as shown in FIG. 3, the steps S1011-S1013 are specifically described as follows:

In the step of S1011, the first public key and first signature data sent by the payment terminal 9 are received.

In this embodiment, the first verification information includes the first public key and the first signature data, and the first signature data includes first device information of the payment terminal 9, the first random number generated by the payment terminal 9, and the first key serial number. Where the first key serial number is a derived unique key per transaction (Derived Unique Key Per Transaction, DUKPT) key hierarchy index, that is, a key serial number (Key Serial Number, KSN) factor. In the DUKPT key hierarchy, two participants to be verified pre-install the same preset key, that is, the root key, and the two participants to be verified may use the KSN factor to perform key synchronization. When encryption and decryption are required, the two verified parties perform KSN synchronization to calculate the corresponding keys respectively.

In this embodiment, the payment terminal 9 obtains the first device information of the payment terminal 9, and packages the generated first random number, the first device information of the payment terminal 9, the first random number generated by the payment terminal 9, and the first key serial number into a data packet according to a rule, and use the private key to sign the data packet to generate the first signature data. The first public key and the first signature data are sent to the user terminal 8.

In the step of S1012, the first public key is verified according to a first preset certificate.

After receiving the first public key and the first signature data sent by the payment terminal 9, the user terminal 8 performs verification on the first public key according to the first preset certificate pre-stored in the user terminal 8. The first preset certificate is a root certificate initially installed in the user terminal 8.

In the step of S1013, when the verification of the first public key is passed, the first signature data is verified according to the first public key.

When the verification of the first public key is passed, the first signature data is verified according to the first public key. If the signature verification succeeds, whether the first device information of the payment terminal 9 is correct is checked at last so as to complete this verification.

The process of verifying the payment terminal 9 by the user terminal 8 is described below with reference to the specific embodiments. The user terminal 8 may send a verification request to the payment terminal 9, and the verification request may include the device information of the user terminal 8 and the random number issued by the server 10. The user terminal 8 generates a new random number RoleB.Random1 and sends its own device information and the random number RoleB.Random1 to the payment terminal 9 to initiate verification of the payment terminal 9. The payment terminal 9 generates a handshake public and private key pair and a first random number RoleA.Random1, calculate digest information of a handshake public key, and RoleA.Random1, the device information of the payment terminal 9, and RoleB.Random1, and uses the initial private key certificate to sign the digest information so as to generate signature data, and send the signature data to the user terminal 8 for signature verification. The user terminal 8 obtains the handshake public key of the payment terminal 9, the device information of the payment terminal 9, and the random number of the payment terminal 9, and uses the initially installed root certificate to verify the public key certificate of the payment terminal 9, and then uses the public key certificate of the payment terminal 9 to perform signature verification on the signature data. If the signature verification is successful, whether the device information of the payment terminal 9 is correct is checked finally.

In the step of S102, second verification information is generated when the verification of the first verification information is passed.

When the user terminal 8 detects that the verification of the first verification information is passed, it indicates that a unidirectional verification of the payment terminal 9 initiated by the user terminal 8 is passed, and the identity of the payment terminal 9 is legal. The user terminal 8 continues to perform verification, and the user terminal 8 needs to let the server 10 to verify the identity of the user terminal 8. The user terminal 8 generates second verification information which is used to initiate a verification request to the server 10 to trigger the server 10 to authenticate the user terminal 8.

When the verification of the second verification information is passed by the server 10, it indicates that the identity authentication of the user terminal 8 is passed by the server 10, and verification of the other devices can be continued to be performed. When the verification of the second verification information is not passed by the server 10, it indicates that the identity authentication of the user terminal 8 is failed, a risk exists currently, and the communication channel is not continued to be established any more.

Figure 4:
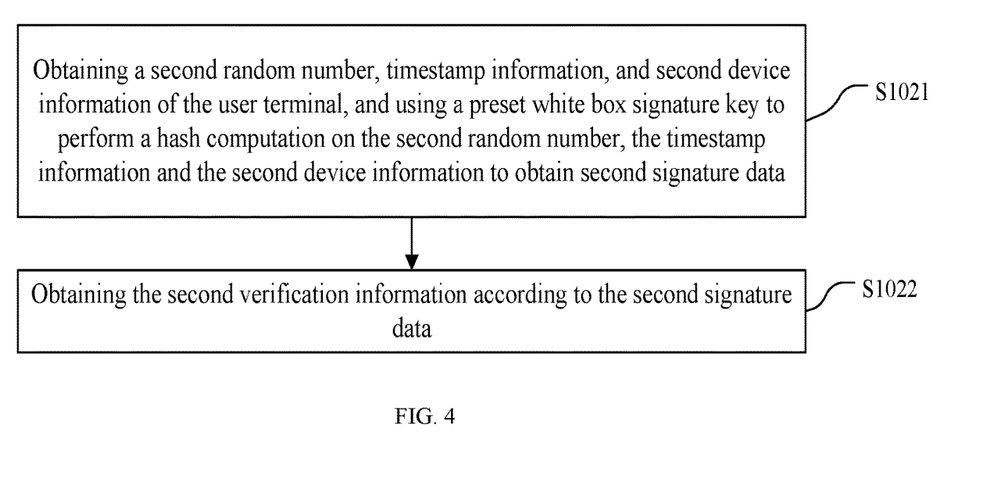
FIG. 4 illustrates a detailed schematic flowchart of a step S102 in the method for establishing communication channel provided by the second embodiment of the present application.

In one possible implementation, since the user terminal 8 is an unsafe device, the user terminal 8 cannot store the private key, so that a white box key may be used by the server 10 to verify the user terminal 8 during verification. Therefore, generating the second verification information may include steps S1021-S1022. As shown in FIG. 4, the steps S1021-S1022 are specifically described as follows:

In the step of S1021, a second random number, timestamp information, and second device information of the user terminal 8 are obtained, and a hash computation is performed on the second random number, the timestamp information and the second device information according to a preset white box signature key to obtain second signature data.

The user terminal 8 generates the second random number, obtains the second random number, the timestamp information, and the second device information of the user terminal 8, and uses a preset white box signature key to perform the hash computation on the second random number, the timestamp information and the second device information so as to obtain the second signature data. The user terminal 8 may further perform the hash computation on the second random number, the timestamp information, the second device information, and a user number to obtain the second signature data.

In the step of S1022, second verification information is obtained according to the second signature data.

The user terminal 8 generates the second verification information according to the second signature data, the second device information thereof, and the first key serial number.

In the step of S103, third verification information is generated according to the first verification information, and the second verification information and the third verification information are sent to the server 10.

The user terminal 8 generates the third verification information according to the first verification information. The first verification information includes the device information of the payment terminal 9, the device information of the user terminal 8, and the second random number issued by the server 10. The preset white box signature key is used to perform the hash computation on the device information of the user terminal 8 and the random number issued by the server 10 to generate the signature data, and the third verification information is generated according to the signature data.

The user terminal 8 sends the second verification information and the third verification information to the server 10. The server 10 receives the second verification information and performs verification on the user terminal 8. The server 10 receives the third verification information and performs verification on the payment terminal 9. After the verification of the user terminal 8 and the verification of the payment terminal 9 have been performed by the server 10, the server 10 needs to return a verification result of the user terminal 8 and a verification result of the payment terminal 9 to the user terminal 8.

In this embodiment, the methods for verifying the payment terminal 9 and the user terminal 8 performed by the server 10 are not limited. For example, a method for verifying the payment terminal 9 by the server 10 may be implemented as follows: the server 10 uses a preset certificate to verify the public key certificate of the payment terminal 9, and uses the public key certificate to verify the signature data of the payment terminal 9 when the verification of the public key certificate is passed. A method for verifying the user terminal 8 by the server 10 may be implemented as follows: the preset white box signature key is used to sign the device information of the user terminal 8, the device information of the payment terminal 9, the second random number and the user number issued by the server 10 which are obtained according to the second verification data to generated signature data, the generated signature data is compared with the signature data in the second verification data, and the verification of the user terminal 8 is completed if the generated signature data is consistent with the signature data in the second verification data.

In the step of S104, when receiving fourth verification information sent by the server 10, the fourth verification information is verified, and the fourth verification information is the verification information generated by the sever after the server 10 has verified the second verification information and the third verification information, and the verification of the second verification information and the verification of the third verification information are passed by the server 10.

When the user terminal 8 receives the fourth verification information sent by the server 10, it indicates that the server 10 has authenticated the identities of the payment terminal 9 and the user terminal 8 currently, and the server 10 submits an authentication request to the user terminal 8.

The fourth verification information is the verification information generated by the server 10 after the server 10 has verified the second verification information and the third verification information, and the verification of the second verification information and the verification of the third verification information are passed by the server 10. When the verification of the payment terminal 9 and the user terminal 8 are passed by the server 10, the authentication request of the server 10 needs to be performed by the user terminal 8. The server 10 may use the first key serial number to generate a new data encryption key and a new signature key, and then generate the corresponding white box keys respectively, and then use its own private key to sign the white box keys, and use the pre-installed white box data key to perform white box hash computation on the random number to generate the data encryption key. Finally, the fourth verification information is generated according to the verified public key certificate, the generated white box signature key, the white box key data, the first key serial number, etc. After the fourth verification information is encrypted by the data encryption key, the fourth verification information is transmitted to the user terminal 8.

Figure 5:
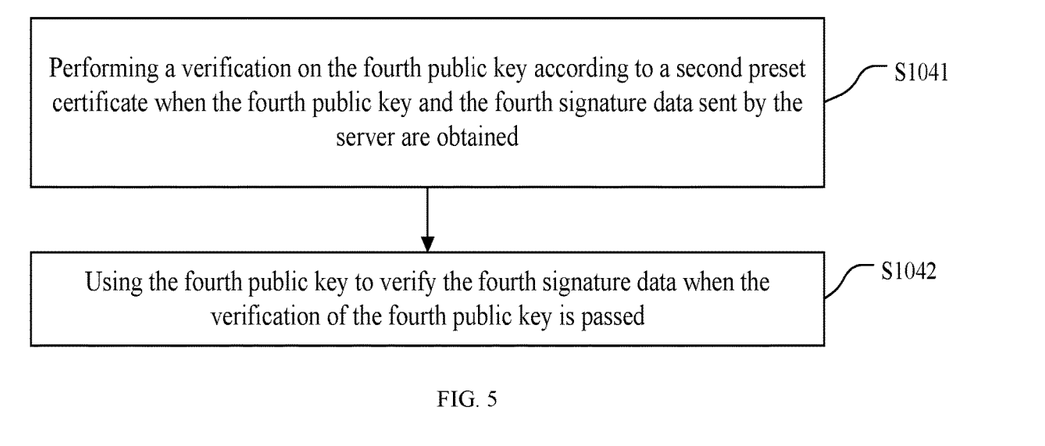
FIG. 5 illustrates a detailed schematic flowchart of a step S104 in the method for establishing communication channel provided by the second embodiment of the present application.

Methods for verifying the fourth verification information are not limited herein. In one embodiment, the fourth verification information includes a fourth public key and fourth signature data, the step S104 may include steps S1041-S1042. As shown in FIG. 5, the steps S1041-S1042 are specifically described as follows:

In the step of S1041, when obtaining the fourth public key and the fourth signature data sent by the server 10, the fourth public key is verified according to a second preset certificate.

After the user terminal 8 receives the fourth public key and the fourth signature data sent by the server 10, the fourth public key is verified according to the second preset certificate pre-stored in the user terminal 8.

Figure 6:
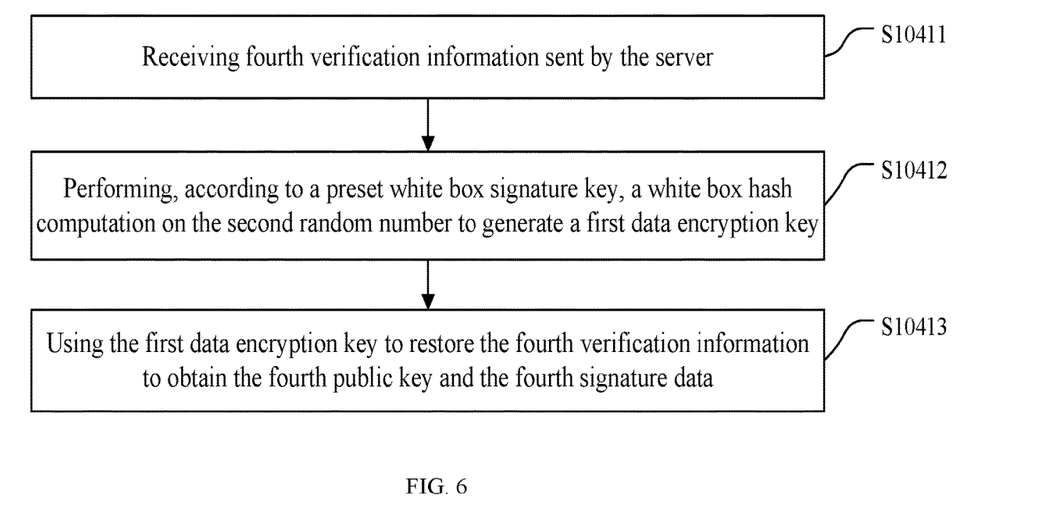
FIG. 6 illustrates a detailed schematic flowchart of a step S1041 in the method for establishing communication channel provided by the second embodiment of the present application.

Obtaining the fourth public key and the fourth signature data sent by the server 10 may specifically include steps S10411-S10413. As shown in FIG. 6, the steps S10411-S10413 includes:

In the step of S10411, the fourth verification information sent by the server 10 is received.

In the step of S10412, a preset white box signature key is used to perform a white box hash computation on the second random number to generate a first data encryption key.

The user terminal 8 uses the preset white box signature key to perform the white box hash computation on the second random number by to generate the first data encryption key.

In the step of S10413, the fourth verification information is restored according to the first data encryption key to obtain the fourth public key and the fourth signature data.

The user terminal 8 uses the first data encryption key to restore the fourth verification information to obtain the fourth public key and the fourth signature data. Then, the fourth public key transmitted by the server 10 is verified, and then the fourth public key is used to verify the fourth signature data, and verification of the server 10 is completed.

In the step of S1042, when the verification of the fourth public key is passed, the fourth signature data is verified according to the fourth public key.

When the verification of the fourth public key is passed, the fourth signature data is verified according to the fourth public key. If the signature verification is successful, the verification of the fourth signature data is completed.

In the step of S105, when the verification of the fourth verification information is passed, fifth verification information is generated according to the first verification information, sixth verification information is generated according to the fourth verification information, and the fifth verification information and the sixth verification information are transmitted to the payment terminal 9.

When the verification of the fourth verification information is passed, the verification of the server 10 is completed by the user terminal 8. Then, the user terminal 8 should initiate a request to the payment terminal 9 in order for requesting the payment terminal 9 to authenticate the user terminal 8 and the server 10, thereby completing bidirectional verification between the user terminal 8, the server 10 and the payment terminal 9.

When the verification of the fourth verification information is passed, the fifth verification information and the fourth verification information are transmitted to the payment terminal 9. The payment terminal 9 verifies the user terminal 8 according to the fifth verification information, and verifies the server 10 according to the fourth verification information.

The first verification information includes the first random number generated by the payment terminal 9 and the first key serial number. The user terminal 8 generates the fifth verification information according to the first verification information, and uses the preset white box key to perform a hash computation on the first random number and the first key serial number so as to generate signature data, and then generates the fifth verification information according to the signature data and the first key serial number, and sends the fifth verification information to the payment terminal 9.

The payment terminal 9 obtains the first key serial number from the fifth verification information sent by the user terminal 8, and uses a preset key serial number stored during a bidirectional verification process to generate a signature key, performs a hash computation on the first random number and the first key serial number to generate signature data, and authenticates the user terminal 8 by comparing the generated signature data with the signature data in the fifth verification information sent by the user terminal 8.

The user terminal 8 generates sixth verification information according to the fourth verification information. The fourth verification information includes signature information, a public key, the second random number issued by the server 10, and the first random number of the payment terminal 9. The user terminal 8 performs a white box key signature on the signature information, the second random number issued by the server 10 and the first random number of the payment terminal 9 to obtain white box signature data, and then generates the sixth verification information according to the public key, the first key serial number signature and the white box signature data.

The payment terminal 9 receives the sixth verification information, uses the pre-installed public key certificate to verify the public key of the server 10, and then uses the public key of the server 10 to verify the signature information, thereby completing the verification of the server 10.

In the step of S106, when detecting that the verification of the fifth verification information and the sixth verification information by the payment terminal 9 is passed, a first communication channel between the user terminal 8 and the payment terminal 9 is established based on a first session key between the user terminal 8 and the payment terminal 9, and a second communication channel between the user terminal 8 and the server 10 is established based on a second session key between the user terminal and the server 10.

When the user terminal 8 detects that the verification of the fifth verification information and the sixth verification information is passed by the payment terminal 9, session keys need to be generated by negotiation, so that the security of data transmission is ensured. The first communication channel between the user terminal 8 and the payment terminal 9 is established based on the first session key between the user terminal 8 and the payment terminal 9, and the second communication channel between the user terminal 8 and the server 10 is established based on the second session key between the user terminal 8 and the server 10.

The establishing of the first communication channel between the user terminal 8 and the payment terminal 9 based on the first session key between the user terminal 8 and the payment terminal 9 may be implemented in the following manner:

A random number seed generation request is sent to the payment terminal 9, that is, the user terminal 8 requests the payment terminal 9 to generate a random number seed. A first handshake public key, a fourth signature data, and a random number ciphertext sent by the payment terminal 9 are received, and a new third random number RoleA.Random2 generated by the payment terminal 9 are taken as the random number seed. The payment terminal 9 uses the first key serial number to generate a data encryption root key through a derived unique key per transaction (Derived Unique key Per Transaction, DUKPT), and performs a hash computation on the first handshake public key of the payment terminal 9 to generate a data encryption key. The data encryption key is used to encrypt the third random number RoleA.Random2. The white box signature key is used to perform a hash computation on the third random number RoleA.Random2 and the second random number generated by the user terminal 8 to generate fourth signature data. Furthermore, the fourth signature data and a random number ciphertext of the third random number RoleA.Random2 are sent to the user terminal 8.

Then, the user terminal 8 performs a white box computation on the first handshake public key to obtain a second data encryption key. The second data encryption key is used to decrypt the random number ciphertext so as to obtain the third random number generated by the payment terminal 9. The user terminal 8 decrypts the random number ciphertext so as to obtain the third random number RoleA.Random2.

The user terminal 8 uses the preset white box signature key to perform a computation on the third random number and the second random number to obtain the fifth signature data. When the fourth signature data is consistent with the fifth signature data, the third random number is saved, and the second handshake public key is generated. The user terminal 8 uses the white-box signature key to perform computation on the third random number RoleA.Random2 and the second random number RoleB.Random1 to generate the fifth signature data, and compares the fifth signature data with the signature data sent by the payment terminal 9, and stores the third random number RoleA.Random2 if the fifth signature data is consistent with the signature data sent by the payment terminal 9. Computation is performed on the third random number and the second handshake public key according to the preset white box signature key, and sixth signature data is generated. The preset white box signature key is used to perform computation on the third random number and the second handshake public key to generate sixth signature data. The user terminal 8 transmits the second handshake public key and the sixth signature data to the payment terminal 9 to initiate a request for generating session keys.

The payment terminal 9 uses the signature key to perform a hash computation on the second handshake public key and the first random number RoleA.Random1 to generate signature data, and compares the signature data with the signature data sent by the user terminal 8. After the generated signature data is consistent with the signature data sent by the user terminal 8 by comparison, the session keys are generated. Firstly, the payment terminal 9 uses its own handshake key private key and the second handshake public key of the user terminal 8 to perform an elliptic curve Diffie-Hellman (Elliptic curve Diffie-Hellman, ECDH) algorithm to generate a Diffie-Hellman (DH) key, and uses the DH key to perform HMAC-based Key Derivation Function (HKDF) computation on the device information of the payment terminal 9, the device information of the user terminal 8 and a session initial value to generate a session key. The HKDF computation is performed on a MAC verification key initial value to generate a MAC verification key. The HKDF computation is performed on the MAC key initial value to generate a MAC key. The HKDF computation is performed on a personal identity number (Personal Identity Number, PIN) key initial value to generate a PIN encryption key. The newly generated session key and the MAC key are used to encrypt a HELLO message to generate the first handshake information. The first handshake information is transmitted to the user terminal 8 to request handshake.

The user terminal 8 receives the first handshake information sent by the payment terminal 9, determines the first session key of the user terminal 8 according to the first handshake information, and establishes the first communication channel between the user terminal 8 and the payment terminal 9 based on the first session key.

The establishing of the second communication channel between the user terminal 8 and the server 10 based on the second session key between the user terminal 8 and the server 10, includes: the preset white box data key is used to perform a white box hash computation on the sixth random number to generate the second session key, and the second communication channel between the user terminal 8 and the server 10 is established based on the second session key. The server 10 may also use the white box data key to perform a white box hash computation on the random number of the user terminal 8 to generate the second session key.

In this embodiment of the present application, the first verification information sent by the payment terminal 9 is received, and the first verification information is verified. The second verification information is generated when the verification of the first verification information is passed. The third verification information is generated according to the first verification information, and the second verification information and the third verification information are transmitted to the server 10. When the fourth verification information sent by the server 10 is received, the fourth verification information is verified. The fifth verification information is generated according to the first verification information, the sixth verification information is generated according to the fourth verification information, and the fifth verification information and the sixth verification information are transmitted to the payment terminal 9. When detecting that the verification of the fifth verification information and the verification of the sixth verification information are passed by the payment terminal 9, the first communication channel between the user terminal 8 and the payment terminal 9 is established based on the first session key between the user terminal 8 and the payment terminal 9, and the second communication channel between the user terminal and the server 10 is established based on the second session key between the user terminal 8 and the server 10. According to the aforesaid technical solutions of the method for establishing communication channel, the security verification is respectively performed on the three participants (i.e., the user terminal 8, the sever and the payment terminal 9) participating in communication, and communication channels (i.e., the first communication channel and the second communication channel) trusted by the three participants are established based on the session keys after the verifications are passed. The security of data transmission is guaranteed, and risks are avoided.

It should be understood that, the values of serial numbers of the steps in the aforesaid embodiments do not indicate an order of execution sequences of the steps. Instead, the execution sequences of the steps should be determined by functionalities and internal logic of the steps, and thus shouldn't be regarded as limitation to implementation processes of the embodiments of the present application.

Figure 7:
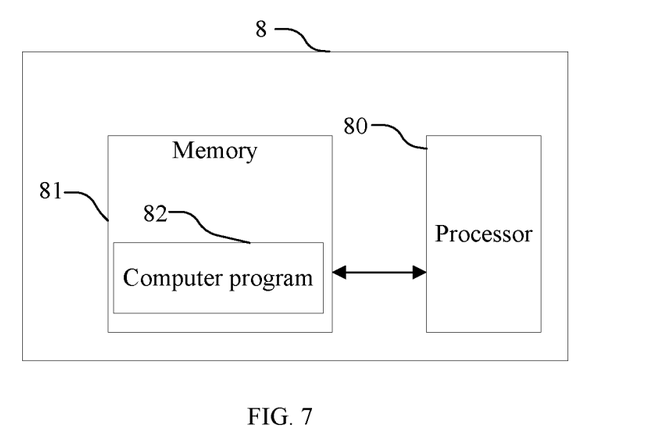
FIG. 7 illustrates a schematic diagram of a user terminal provided by the third embodiment of the present application.

FIG. 8 illustrates a schematic diagram of a user terminal 8 provided by one embodiment of the present application. As shown in FIG. 8, the user terminal 8 in this embodiment includes: a processor 80, a memory 81 and a computer program 82 (e.g., a procedure for establishing communication channel) stored in the memory 81 and executable by the processor 80. When executing the computer program 82, the processor 80 is configured to implement the steps of the various method embodiments for establishing communication channel, such as the steps 101-106 shown in FIG. 2. As an alternative, when executing the computer program 82, the processor 80 is configured to implement the functionalities of the various modules/units in the various device embodiments, such as the functions of the unit 710, the unit 720, the unit 730, the unit 740, the unit 750 and the unit 760 in the various device embodiments.

For example, the computer program 82 may be segmented into one or a plurality of modules/units, the one or plurality of modules/units are stored in the memory 81, and executed by the processor 80 so as to implement the present application. The one or plurality of modules/units may be a series of computer program instruction segments that can accomplish particular functionalities, these instruction segments are used for describing an executive process of the computer program 82 in the user terminal 8. For example, the computer program 82 may be segmented into the first processing unit, the second processing unit, the first transmission unit, the third processing unit, the second transmission unit, the fourth processing unit. The functionalities of the various units are described below:

the first processing unit is configured to receive first verification information sent by a payment terminal 9, and perform a verification on the first verification information;

the second processing unit is configured to generate second verification information when the verification of the first verification information is passed;

the first transmission unit is configured to generate third verification information according to the first verification information, and transmitting the second verification information and the third verification information to a server 10;

the third processing unit is configured to perform a verification on fourth verification information when receiving the fourth verification information sent by the server 10; the fourth verification information is verification information generated by the server 10 after the server 10 has verified the second verification information and the third verification information respectively, and a verification of the second verification information and a verification of the third verification information are passed;

the second transmission unit is configured to transmit the second verification information and the fourth verification information to the payment terminal 9 when the verification of the fourth verification information is passed;

the fourth processing unit is configured to establish a first communication channel between the user terminal 8 and the payment terminal 9 based on a first session key between the user terminal 8 and the payment terminal 9 and establishing a second communication channel between the user terminal 8 and the server 10 based on a second session key between the user terminal 8 and the server 10, when detecting that a verification of the second verification information and a verification of the fourth verification information are passed by the payment terminal 9.

The user terminal 8 may be a computing device such as a desktop computer, a tablet computer, a cloud server and a mobile terminal, etc. The user terminal 8 may include but is not limited to: the processor 80, the memory 81. A person of ordinary skill in the art can understand that, FIG. 8 is only one example of the user terminal 8, but should not be constituted as limitation to the user terminal 8. More or less components than the components shown in FIG. 8 may be included. As an alternative, some components or different components may be combined; for example, the user terminal 8 may also include an input and output device, a network access device, a bus, etc.

The so-called processor 80 may be a central processing unit (Central Processing Unit, CPU), and may also be other general purpose processor, digital signal processor (Digital Signal Processor, DSP), application specific integrated circuit (Application Specific Integrated Circuit, ASIC), field-programmable gate array (Field-Programmable Gate Array, FGPA), or some other programmable logic devices, discrete gate or transistor logic device, discrete hardware component, etc. The general purpose processor may be a microprocessor. As an alternative, the processor may also be any conventional processor, or the like.

The memory 81 may be an internal storage unit of the user terminal 8, such as a hard disk or a memory of the user terminal 8. The memory 81 may also be an external storage device of the user terminal 8, such as a plug-in hard disk, a smart media card (Smart Media Card, SMC), a secure digital (Secure Digital, SD) card, a flash card equipped on the user terminal 8. Furthermore, the memory 81 may not only include the internal storage unit of the user terminal 8 but also include the external memory of the user terminal 8. The memory 81 is configured to store the computer program, and other procedures and data needed by the user terminal 8. The memory 81 may also be configured to store data that has been output or being ready to be output temporarily.

In the aforesaid embodiments, the contents including the information interaction and the execution process between the aforesaid various devices/units and the method embodiments of the present application are based on the same concept. Regarding the specific functions of the devices/units and the technical effects generated by the functions, reference can be made to the part in the method embodiments, the specific functions of the devices/units and the technical effects of the functions of the devices/units are not repeatedly described herein.

The person of ordinary skill in the art may understand clearly that, for the convenience of illustration and for conciseness, the dividing of the aforesaid various functional units and functional modules is merely described according to examples, in an actual application, the aforesaid functions may be assigned to different functional units and functional modules to be accomplished, that is, an inner structure of the device is divided into different functional units or modules, so that the whole or a part of functionalities described above can be accomplished. The various functional units and modules in the embodiments may be integrated into a processing unit, or each of the units exists independently and physically, or two or more than two of the units are integrated into a single unit. The aforesaid integrated unit may either by actualized in the form of hardware or in the form of software functional units. In addition, specific names of the various functional units and modules are only used to distinguish from each other conveniently, rather than being intended to limit the protection scope of the present application. Regarding the specific working process of the units and modules in the aforesaid system, reference may be made to a corresponding process in the aforesaid method embodiments. The specific working process is not repeatedly described herein.

A network device is further provided in the embodiments of the present application, the network device includes: at least one processor, a memory and a computer program stored in the memory and executable by the at least processor. The processor is configured to, when executing the computer program, implement the steps in any one of the method embodiments.

A computer-readable storage medium is further provided in the embodiments of the present application. The computer-readable storage medium stores a computer program, that, when executed by the processor, causes the processor to implement the steps in the various method embodiments.

A computer program product is further provided in the embodiments of the present application. When the computer program product is executed on a mobile terminal, the mobile terminal is caused to implement the steps in the various method embodiments.

In the aforesaid embodiments, the descriptions of the various embodiments are emphasized respectively. Regarding a part of one embodiment which has not been described or disclosed in detail, reference can be made to relevant descriptions in other embodiments.

The foregoing embodiments are only intended to explain the technical solutions of the present application, rather than being constituted as limitations to the technical solutions of the present application. Although the present application has been described in detail with reference to these embodiments, the person of ordinary skilled in the art should understand that, the technical solutions disclosed in the embodiments may be further modified, some technical features in the technical solutions may also be equivalently replaced. The modifications or the replacements don't cause the essence of the corresponding technical solutions to be deviated from the spirit and the scope of the technical solutions in the embodiments of the present application, and thus should all be included in the protection scope of the present application.

What is claimed is:

1. A method for establishing a communication channel, implemented by a user terminal, the method comprising:
receiving first verification information sent by a payment terminal, and performing a verification on the first verification information;
generating second verification information when the verification of the first verification information is passed;
generating third verification information according to the first verification information, and transmitting the second verification information and the third verification information to a server;
performing, when receiving fourth verification information sent by the server, a verification on the fourth verification information; wherein the fourth verification information is verification information generated by the server after the server has verified the second verification information and the third verification information respectively, and a verification of the second verification information and a verification of the third verification information are passed by the server;
generating, when the verification of the fourth verification information is passed by the server, fifth verification information according to the first verification information, generating sixth verification information according to the fourth verification information, and transmitting the fifth verification information and the sixth verification information to the payment terminal; and
establishing a first communication channel between the user terminal and the payment terminal based on a first session key between the user terminal and the payment terminal, and establishing a second communication channel between the user terminal and the server based on a second session key between the user terminal and the server, when detecting that a verification of the fifth verification information and a verification of the sixth verification information are passed by the payment terminal.

2. The method according to claim 1, wherein the first verification information comprises a first public key and first signature data; the first signature data comprises first device information of the payment terminal, a first random number generated by the payment terminal, and a first key serial number;
   said receiving the first verification information sent by the payment terminal and performing the verification on the first verification information comprises:
   receiving the first public key and the first signature data sent by the payment terminal;
   performing a verification on the first public key according to a first preset certificate; and
   using the first public key to verify the first signature data when the verification of the first public key is passed.

3. The method according to claim 1, wherein said generating the second verification information comprises:
   obtaining a second random number, timestamp information, and second device information of the user terminal, and performing a hash computation on the second random number, the timestamp information and the second device information according to a preset white box signature key to obtain second signature data; and
   obtaining the second verification information according to the second signature data.

4. The method according to claim 1, wherein the fourth verification information comprises a fourth public key and fourth signature data;
   said performing the verification on the fourth verification information when receiving the fourth verification information sent by the server comprises:
   performing a verification on the fourth public key according to a second preset certificate when the fourth public key and the fourth signature data sent by the server are obtained; and
   using the fourth public key to verify the fourth signature data when the verification of the fourth public key is passed.

5. The method according to claim 4, wherein said obtaining the fourth public key and the fourth signature data sent by the server comprises:
   receiving the fourth verification information sent by the server;
   performing, according to a preset white box signature key, a white box hash computation on the second random number to generate a first data encryption key; and
   using the first data encryption key to restore the fourth verification information so as to obtain the fourth public key and the fourth signature data.

6. The method according to claim 1, wherein said establishing the first communication channel between the user terminal and the payment terminal based on the first session key between the user terminal and the payment terminal comprises:
   transmitting a random number seed generation request to the payment terminal;
   receiving a first handshake public key, fourth signature data, and a random number ciphertext sent by the payment terminal;
   performing a white box computation on the first handshake public key to obtain a second data encryption key;
   decrypting, according to the second data encryption key, the random number ciphertext to obtain a third random number generated by the payment terminal;
   performing, by using a preset white box signature key, a computation on the third random number and the second random number to obtain fifth signature data;
   storing the third random number and generating a second handshake public key, when the fourth signature data is consistent with the fifth signature data;
   performing, according to the preset white box signature key, a computation on the third random number and the second handshake public key to generate sixth signature data;
   transmitting the second handshake public key and the sixth signature data to the payment terminal;
   receiving first handshake information sent by the payment terminal; and
   determining the first session key between the user terminal and the payment terminal according to the first handshake information, and establishing the first communication channel between the user terminal and the payment terminal based on the first session key between the user terminal and the payment terminal.

7. The method according to claim 1, wherein said establishing the second communication channel between the user terminal and the server based on the second session key between the user terminal and the server comprises:
   performing, according to a preset white box data key, a white box hash computation on a sixth random number to generate the second session key between the user terminal and the server, and establishing the second communication channel between the user terminal and the server based on the second session key between the user terminal and the server.

8. A user terminal, comprising a memory, a processor, and a computer program stored in the memory and executable by the processor, wherein, the processor is configured to, when executing the computer program, implement steps of a method for establishing communication channel, comprising:
   receiving first verification information sent by a payment terminal, and performing a verification on the first verification information;
   generating second verification information when the verification of the first verification information is passed;
   generating third verification information according to the first verification information, and transmitting the second verification information and the third verification information to a server;
   performing, when receiving fourth verification information sent by the server, a verification on the fourth verification information; wherein the fourth verification information is verification information generated by the server after the server has verified the second verification information and the third verification information respectively, and a verification of the second verification information and a verification of the third verification information are passed by the server;
   generating, when the verification of the fourth verification information is passed by the server, fifth verification information according to the first verification information, generating sixth verification information according to the fourth verification information, and transmitting the fifth verification information and the sixth verification information to the payment terminal; and
   establishing a first communication channel between the user terminal and the payment terminal based on a first session key between the user terminal and the payment terminal, and establishing a second communication channel between the user terminal and the server based on a second session key between the user terminal and the server, when detecting that a verification of the fifth verification information and a verification of the sixth verification information are passed by the payment terminal.

9. A non-transitory computer-readable storage medium, which stores a computer program, that, when executed by a processor of a user terminal, causes the processor of the user terminal to implement steps of a method for establishing communication channel, comprising:

receiving first verification information sent by a payment terminal, and performing a verification on the first verification information;

generating second verification information when the verification of the first verification information is passed;

generating third verification information according to the first verification information, and transmitting the second verification information and the third verification information to a server;

performing, when receiving fourth verification information sent by the server, a verification on the fourth verification information; wherein the fourth verification information is verification information generated by the server after the server has verified the second verification information and the third verification information respectively, and a verification of the second verification information and a verification of the third verification information are passed by the server;

generating, when the verification of the fourth verification information is passed by the server, fifth verification information according to the first verification information, generating sixth verification information according to the fourth verification information, and transmitting the fifth verification information and the sixth verification information to the payment terminal; and establishing a first communication channel between the user terminal and the payment terminal based on a first session key between the user terminal and the payment terminal, and establishing a second communication channel between the user terminal and the server based on a second session key between the user terminal and the server, when detecting that a verification of the fifth verification information and a verification of the sixth verification information are passed by the payment terminal.

10. The user terminal according to claim 8, wherein the first verification information comprises a first public key and first signature data; the first signature data comprises first device information of the payment terminal, a first random number generated by the payment terminal, and a first key serial number;

the processor is particularly configured to implement the step of receiving the first verification information sent by the payment terminal and performing the verification on the first verification information by:

receiving the first public key and the first signature data sent by the payment terminal; performing a verification on the first public key according to a first preset certificate; and using the first public key to verify the first signature data when the verification of the first public key is passed.

11. The user terminal according to claim 8, wherein the processor is particularly configured to implement the step of generating the second verification information comprises:

obtaining a second random number, timestamp information, and second device information of the user terminal, and performing a hash computation on the second random number, the timestamp information and the second device information according to a preset white box signature key to obtain second signature data; and obtaining the second verification information according to the second signature data.

12. The user terminal according to claim 8, wherein the fourth verification information comprises a fourth public key and fourth signature data;

the processor is particularly configured to implement the step of performing the verification on the fourth verification information when receiving the fourth verification information sent by the server by:

performing a verification on the fourth public key according to a second preset certificate when the fourth public key and the fourth signature data sent by the server are obtained; and using the fourth public key to verify the fourth signature data when the verification of the fourth public key is passed.

13. The user terminal according to claim 12, wherein the processor is particularly configured to implement the step of obtaining the fourth public key and the fourth signature data sent by the server by:

receiving the fourth verification information sent by the server;

performing, according to a preset white box signature key, a white box hash computation on the second random number to generate a first data encryption key; and using the first data encryption key to restore the fourth verification information so as to obtain the fourth public key and the fourth signature data.

14. The user terminal according to claim 8, wherein the processor is particularly configured to implement the step of establishing the first communication channel between the user terminal and the payment terminal based on the first session key between the user terminal and the payment terminal by:

transmitting a random number seed generation request to the payment terminal;

receiving a first handshake public key, fourth signature data, and a random number ciphertext sent by the payment terminal;

performing a white box computation on the first handshake public key to obtain a second data encryption key;

decrypting, according to the second data encryption key, the random number ciphertext to obtain a third random number generated by the payment terminal;

performing, by using a preset white box signature key, a computation on the third random number and the second random number to obtain fifth signature data;

storing the third random number and generating a second handshake public key, when the fourth signature data is consistent with the fifth signature data;

performing, according to the preset white box signature key, a computation on the third random number and the second handshake public key to generate sixth signature data;

transmitting the second handshake public key and the sixth signature data to the payment terminal;

receiving first handshake information sent by the payment terminal; and determining the first session key between the user terminal and the payment terminal according to the first handshake information, and establishing the first communication channel between the user terminal and the payment terminal based on the first session key between the user terminal and the payment terminal.

15. The user terminal according to claim 8, wherein the processor is particularly configured to implement the step of establishing the second communication channel between the user terminal and the server based on the second session key between the user terminal and the server by:

performing, according to a preset white box data key, a white box hash computation on a sixth random number to generate the second session key between the user terminal and the server, and establishing the second communication channel between the user terminal and the server based on the second session key between the user terminal and the server.

* * * * *